United States Patent
Lutz

(10) Patent No.: US 8,714,448 B2
(45) Date of Patent: May 6, 2014

(54) DEVICE FOR HANDLING BANKNOTES COMPRISING A HEIGHT ADJUSTABLE USER INTERFACE

(75) Inventor: Bernhard Lutz, Delbrueck (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 13/541,116

(22) Filed: Jul. 3, 2012

(65) Prior Publication Data
US 2013/0013105 A1 Jan. 10, 2013

(30) Foreign Application Priority Data
Jul. 4, 2011 (DE) .......................... 10 2011 051 543

(51) Int. Cl.
*G06K 5/00* (2006.01)
*G06F 5/00* (2006.01)

(52) U.S. Cl.
USPC ........... 235/380; 235/379; 235/375; 235/382; 705/43

(58) Field of Classification Search
USPC ..................... 235/375, 379, 380, 382; 705/43
See application file for complete search history.

(56) References Cited

U.S. PATENT DOCUMENTS

| | | | |
|---|---|---|---|
| 6,296,079 B1 | 10/2001 | McNaughton | |
| 6,812,917 B2 | 11/2004 | Jenkins et al. | |
| 7,644,039 B1 * | 1/2010 | Magee et al. | 705/43 |
| 7,712,657 B1 | 5/2010 | Block et al. | |
| 8,432,476 B2 * | 4/2013 | Ashforth et al. | 348/333.12 |
| 2006/0151596 A1 * | 7/2006 | Scanlon | 235/379 |
| 2008/0025529 A1 * | 1/2008 | Keohane et al. | 381/104 |
| 2009/0218203 A1 * | 9/2009 | Taverner | 200/304 |
| 2010/0126805 A1 * | 5/2010 | Oh | 186/37 |
| 2012/0223135 A1 * | 9/2012 | Meek et al. | 235/379 |
| 2013/0100014 A1 * | 4/2013 | Rabanos et al. | 345/156 |

FOREIGN PATENT DOCUMENTS

AT 11103 U1 4/2010

OTHER PUBLICATIONS

John N. Porter, 2 page letter addressed to Commissioner for Patents and 12 page "claim charts" (dated Feb. 21, 2014).

* cited by examiner

*Primary Examiner* — Allyson Trail
(74) *Attorney, Agent, or Firm* — Harness, Dickey & Pierce, P.L.C.

(57) ABSTRACT

The invention relates to a device (10) for handling banknotes that comprises a display unit (20) with a display surface (22) for displaying at least one graphic user interface (28) to a user of the device (10). The user interface (28) is only displayed in a portion (32 to 36) of the display surface (22), whereas this portion (32 to 36) is adjustable depending on the position of the user relative to the display surface (22).

20 Claims, 2 Drawing Sheets

DEVICE FOR HANDLING BANKNOTES COMPRISING A HEIGHT ADJUSTABLE USER INTERFACE

CROSS REFERENCE TO RELATED APPLICATIONS

This application claims the benefit and priority of German Patent Application No. 10 2011 051 543.7 filed Jul. 4, 2011. The entire disclosure of the above application is incorporated herein by reference.

FIELD OF THE INVENTION

The invention relates to a device for handling banknotes, comprising a display including a display surface for displaying at least one graphic user interface to a user of the device.

BACKGROUND OF THE INVENTION

The device is in particular an automated teller machine by means of which banknotes are dispensed to a user and/or banknotes can be deposited in the automated teller machine by the user. For this purpose several graphic user interfaces are displayed via a display unit to the user, by means of which the user can control the device. In particular via such graphic user interfaces the user can be requested to carry out the individual steps that are necessary for depositing and/or dispensing the banknotes.

The problem with known automated teller machines is that these comprise stationary display units with a preset fixed height. Thus, it can be the case that users who are extraordinarily tall or extraordinarily small may have difficulties reading the display unit. Moreover, automated teller machines are known that can be operated from a vehicle. As vehicles as well can have different seat heights there is also the problem that the position of the user relative to the display unit is different depending on the vehicle and thus in this case also problems can occur with regard to reading the display unit.

In order to solve this problem it is possible to provide display units that are height adjustable mechanically and/or that are pivoted about an axis of rotation, so that the direction of the display surface is adjustable relative to the user. Such devices are for example known from documents U.S. Pat. Nos. 6,296,079 B1, 6,812,917 B2, 7,644,039 B1 and US 2010/0126805. The problem with such mechanically adjustable display units is that they are quite failure-prone and they require a cost-intensive installation.

It is the object of the invention to specify a device for handling banknotes which can be operated easily by persons in different heights.

According to the invention the graphic user interface is only shown in a portion of the display surface with this portion being adjustable depending on the position of the user relative to the display surface. Thus, it is achieved that the height in which the user interface is displayed can be adjusted to the height of the user without requiring to mechanically adjust the display unit itself.

As a position of the user in particular a height of the head of the user is determined, and depending on this determined height of the user the height of the user interface is adjusted by means of selecting the respective portion of the display surface that is displayed via the user interface.

The device for handling banknotes is in particular an automated teller machine. The user can operate the device when standing in front of the device or when sitting in a vehicle.

In a preferred embodiment of the invention the device comprises a sensor unit for determining the position of the user. A control unit of the device determines in dependence of the position determined via the sensor unit the portion in which the display unit displays the user interface. The sensor unit is particularly designed such that by means of it the body height and/or the height of the user and/or the height of a vehicle in which the user is sitting and/or the height of the head of the user can be determined. In the control unit in particular a correlation rule is stored, that assigns a portion to each respective determined body height or height, in which the user interface is to be displayed. The control unit controls the display unit such that it displays the user interface in this area determined by means of the correlation rule.

Additionally or alternatively the device can be provided with at least one operating unit by means of which the user can adjust the portion in which the user interface is displayed. In case such an operating unit is provided additionally to the sensor unit the user can adjust the portion if it does not suit the individual requirements. In particular, by means of such an operating unit the user can adjust at any time the optimal display height.

Furthermore, the device can comprise a card reading unit for reading a magnetic stripe card and/or a chip card, wherein on the magnetic stripe card and/or on the chip card data are stored with information on a preset preferred portion for displaying the user interface, which can be read out by means of the card reading unit. The control unit controls the device in dependence of these data such that the user interface is displayed in the preset portion. Alternatively, instead of a preset portion the body height of the user who owns the magnetic stripe card or the chip card can also be stored on the magnetic stripe card or on the chip card, whereas in this case the control unit determines the portion in dependence of the stored height. Moreover, a data base can be stored in the control unit in which the magnetic stripe card and/or the chip card and/or the user is assigned to the preferred section.

The display unit comprises in particular a touch screen, so that the display unit serves at the same time as an input unit, and the user can control the device in a simple way intuitively by means of touching the selection menu displayed via the graphic user interface. Alternatively, the display unit can be a monitor by means of which no input is possible.

Further, it is advantageous when at least two positions for the portion by means of which the user interface is displayed are preset, and when in dependence of the position of the user one of these preset positions is selected for displaying the user interface. In an especially preferred embodiment of the invention three positions for the portion are preset. In an alternative embodiment of the invention the portion can be moved continuously, particularly line by line, within the display surface.

In an especially preferred embodiment of the invention the display surface is rectangular and thus has a first side with a first side length and a second side with a second side length. The user interface is rectangular as well and has a third side with a third side length and a fourth side with a third side length and a fourth side with a fourth side length, with the first side and the third side being parallel to each other. Preferably the first side length and the third side length are equal, and the second side length is larger than the fourth side length. Thus, it is achieved that the user interface is displayed over the entire width of the display unit, but only a part of the height of the display surface is used. In particular, the user interface has the format 16:9.

The first side is arranged horizontally in an operating arrangement of the device, so that the first side length indicates the width of the display unit and the second side length indicates the height of the display unit. The operating arrangement is the arrangement in which the device is arranged when it is installed for regular operation.

Preferably, the second side length is an integral multiple, especially three times the fourth side length. Thus, several positions can be preset for the user interface without the respective sections overlapping.

In particular, several portions of the display surface for displaying the user interface are preset, wherein the number of the present portions corresponds to the relation of the second side length to the fourth side length, and wherein the sections are preset without overlapping.

Further, it is advantageous if along the second side of the display surface and/or along a fifth side of the display surface opposite to the second side a multitude of keys is arranged for selecting control information displayed by means of the user interface. In particular, by means of these keys the desired cash sum can be selected. A control unit of the device activates in dependence of the portion in which the user interface is displayed a subset of the keys arranged adjacent to this portion and/or deactivates the remaining keys. Thus, in each case only the keys that are arranged next to the user interface are usable for the input of information. Furthermore, by providing such a multitude of keys it is possible to select the control information displayed via the user interface, independent of the portion in which the user interface is displayed.

The sensor comprises in particular a camera for taking at least one picture of an image of the detecting area. The control unit controls a stored image processing program by means of which the control unit detects the position of the user. In particular, by means of the control unit an image of the head of the user in the image is detected. For this case in particular a known face recognition method can be used. In an alternative embodiment of the invention by means of the camera several pictures can be taken in a time-delayed manner and these pictures can be taken into consideration for detecting the position. Further, several cameras can be provided, in particular two cameras that form a stereo camera system and can be used for determining the position of the user.

The operating unit, by means of which the user can vary the display height of the user interface, that means the portion in which the user interface is displayed, comprises in particular a first and a second key, wherein the first key serves to move the portion in a first direction and the second key serves to move the portion in a second direction opposite to the first direction. Thus, the height in which the user interface is displayed can be controlled by the user intuitively in a simple manner, without requiring any knowledge of the operation of the device.

Further features and advantages of the invention result from the following description which in connection with the enclosed Figures explains the invention in more detail with reference to embodiments.

DETAILED DESCRIPTION OF THE PREFERRED EMBODIMENTS

Figure 1:
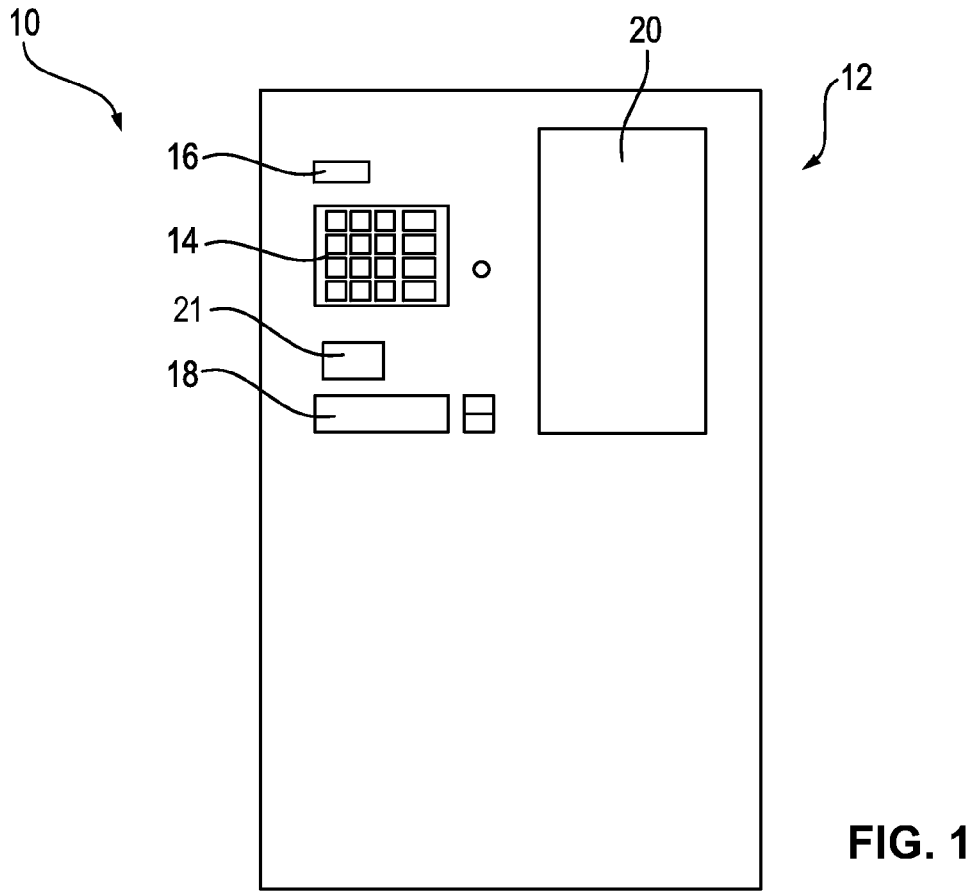
FIG. 1 shows a schematic illustration of a device for handling banknotes according to a first embodiment.

In FIG. 1, a schematic view of a device 10 for handling banknotes is shown. The device 10 is in particular an automated teller machine, wherein the automated teller machine 10 can be a mere cash deposit machine, a mere cash dispensing machine or as well a cash recycling machine, in which banknotes can be deposited or dispensed. Alternatively, the device 10 can also be an automatic cash safe or an automatic cash register system.

The device 10 has a head module 12 that in particular comprises a keyboard 14, a card reading unit 16 for reading magnetic stripe cards and/or chip cards, an input/output compartment 18 and a display unit 20. The keyboard 14 serves to enter information by a user, in particular to enter the PIN belonging to the magnetic stripe card or chip card and/or the desired cash sum.

In FIG. 1 only a slot of the card reading unit 16 is visible, through which the magnetic stripe card and/or the chip card is inserted by the user before it is read out by the card reading unit, i.e. that data stored on the magnetic stripe of the magnetic stripe card and/or chip card and/or on the chip of the magnetic stripe card and/or chip card are read out by the card reading unit 16.

During operation different user interfaces are displayed to the user via the display unit 20, through which the user can control the device 10. In particular, by means of a corresponding user interface after inserting the magnetic stripe card and/or chip card the user is requested to enter the PIN via the keyboard 14. Subsequently, by means of the display unit 20, that is in particular designed as a touchscreen, the user can select what he or she intends to do. In particular, the user is shown several possibilities by means of the corresponding user interface via the display unit 20 that can be executed by the device 10. For example, the user can select to withdraw money from the account. In this case by means of a user interface that is preset correspondingly, the user is shown several preset amounts of money, wherein the user can select the desired amount of money by touching the touchscreen on the respective point, or he or she can enter a different amount of money via the keyboard 14.

Subsequently, a control unit 21 controls the device 10 such that banknotes are removed from the cash boxes according to the required amount of money and are handed out via the input and/or output compartment 18 to the user.

Figure 2:
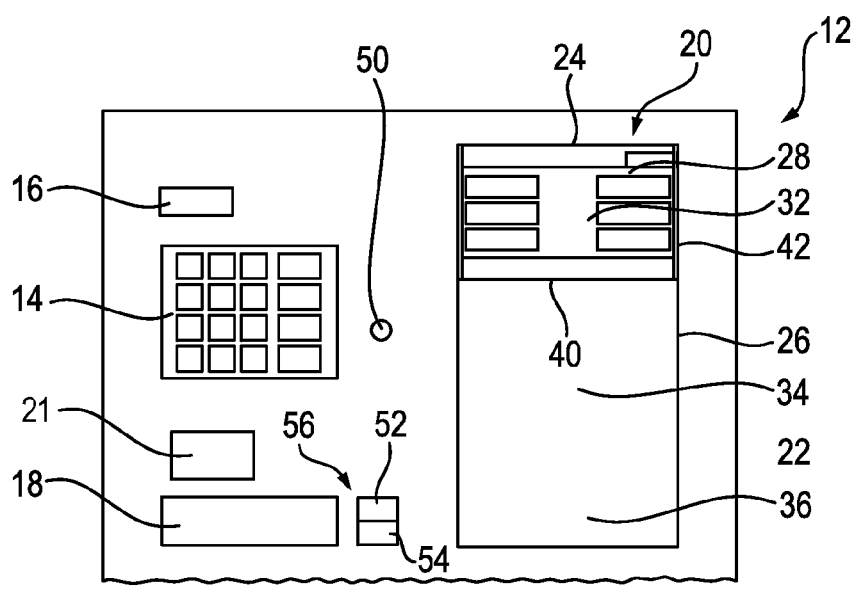
FIG. 2 shows a schematic illustration of a head module of the device according to FIG. 1 in a first operating state.
Figure 3:
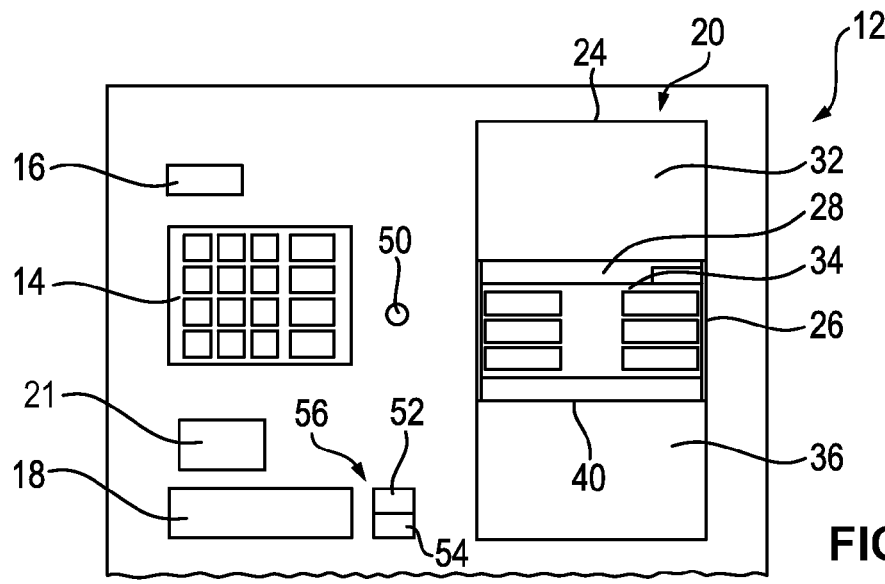
FIG. 3 shows a schematic illustration of the head module according to FIG. 2 in a second operating state.
Figure 4:
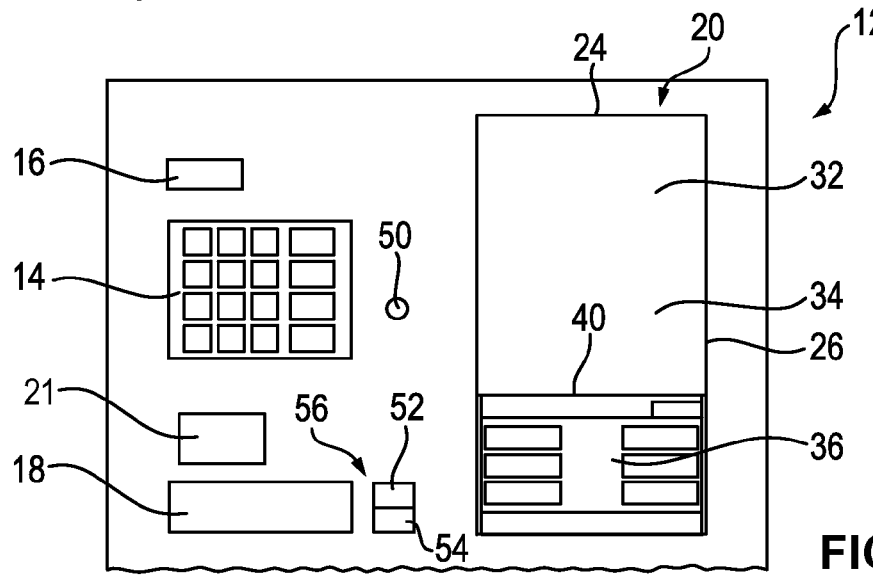
FIG. 4 shows a schematic illustration of the head module according to FIGS. 2 and 3 in a third operating state.

The display unit 20 is arranged stationarily, in particular the position of the display unit 20 and/or its arrangement are not adapted, as is the case with the known device 10, to the height of the user. Instead, as shown in FIGS. 2 to 4, the user interface 28 is only displayed in a portion of the display surface 22 of the display unit 20, and this portion is correspondingly adapted to the position, in particular to the height of the user of the device 10. In the first operating state shown in FIG. 2 the user interface 28 is displayed in a first portion 32, in the operating state shown in FIG. 3 in a second portion 34, and in a third operating state in a third portion 36 of the display surface 22. For this purpose the rectangular display surface 22 is accordingly larger than is the case in known devices for handling banknotes, so that the user interface 28 is displayed to the user in a known size and only the position on the display surface 22 is changed.

In an alternative embodiment of the invention, also more than three portions 32 to 36, in which the user interface 28 can be displayed, can be preset. In the same way, only two portions can be preset. Moreover, alternatively it is possible that no fixed portions are preset, but that the portion in which the user interface 28 is displayed, is adapted continuously to the position of the user.

The display surface 22 has in particular a first side 24 with a first side length and a second side 26 with a second side length. Accordingly, the user interface 28 is preset in a rectangular shape and has a third side 40 with a third side length and a fourth side 42 with a fourth side length. In the first embodiment shown in FIGS. 1 to 4 the first side length and the third side length are identical and are directed horizontally. The fourth side length is designed smaller than the second side length. In particular, the second side length corresponds three times the fourth side length, so that the three portions 32 to 36 do not overlap. In an alternative embodiment the third side length can also be smaller than the first side length.

The device 10 has a sensor 50 by means of which the position of the user in front of the device 10 can be detected. In particular, by means of the sensor 50 the height of the user can be detected, wherein the control unit of the device 10 determines, depending on the determined height, the portion 32 to 36, in which the user interface 28 is displayed.

In the control unit in particular a data base is stored in which for different preset areas of the determined height of the user the section 32 to 36 is assigned in which in the respective case the user interface 28 is to be displayed. The control unit determines by means of this data base the respective section 32 to 36 and controls the display unit 20 such that the user interface 28 is displayed in the determined section 32 to 36.

In particular, the sensor 50 comprises a camera by means of which pictures with images of a detection area are taken. The control unit executes a preset image processing program and on this basis determines the position of the user, preferably the position of the head of the user. Additionally or alternatively, the sensor 50 can also comprise an ultrasound sensor and/or at least one light barrier by means of which the position of the user is determined.

Furthermore, the device has an operating unit 56 comprising two keys 52, 54 by means of which the user of the device can adjust the portion 32 to 36 in which the user interface 28 is displayed. In particular, by means of the sensor 50 the portion 32 to 36 is determined in which the user interface 28 is displayed. The user can then scroll the user interface 28 via the keys 52, 54 upwards and downwards. By doing so, the scrolling can take place continuously or rapidly from one section 32 to 36 to an adjacent section 32 to 36.

The operating unit 56, through which the portion 32 to 36 and/or the display height of the operating surface can be varied by the user can also comprise a control dial and/or a rocker switch.

In an alternative embodiment of the invention no sensor 50 can be provided, but the adjustment of the section 32 to 36 can take place by means of the operating unit 56 exclusively. Furthermore, in the magnetic stripe and/or the chip of the magnetic stripe and/or the chip card of the user data with information on a preferred portion 32 to 36 for displaying the user interface 28 can be stored. The card reading unit 16 reads out these data and the control unit controls the display unit 20 dependently from the read out data such that it displays the user interface 28 in the preset preferred section 32 to 36. Further, additionally or alternatively on the chip and/or the magnetic stripe of the magnetic stripe card and/or chip card the height of the user and/or the height of a vehicle driven by the user can be stored, and the control unit can determine, depending on this stored body height or height, the optimal section 32 to 36 and can control the display unit 20 such that the user interface 28 in this section 32 to 36 is displayed.

Figure 5:
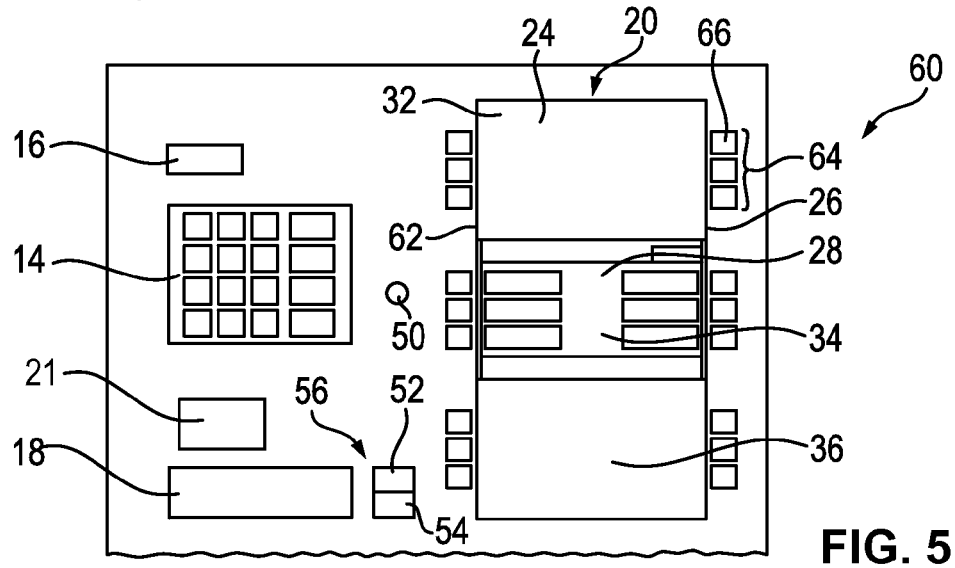
FIG. 5 shows a schematic illustration of a head module of a device for handling banknotes according to a second embodiment.

FIG. 5 is a schematic illustration of a head module 60 of a device 10 for handling banknotes according to a second embodiment. In this second embodiment the display unit 20 is not a touch screen, but a monitor by means of which only information can be displayed, but it does not comprise a touch sensitive surface.

In this case along the second side 26 and the fifth side 62 opposite to the second side 26 of the display surface 22 three input units are illustrated, each comprising three keys. One of these input units is exemplarily identified with the reference sign 64, one of the keys exemplarily with the reference 66. In each case two of the input units 64 are assigned to one of the portion 32 to 36. Thus, via the keys of the respective input unit 64 a selection can be made, irrespective of the section 32 to 36 in which the user interface is displayed, with regard to the alternatives displayed by the user interface 28. Thus, an especially simple and comfortable handling is achieved despite varying the sections 32 to 36.

The control unit in particular activates only those input units 64 that are assigned to the section 32 to 36, in which the user interface 28 is currently displayed. The remaining input units 64 that are not arranged adjacent to this section 32 to 36 are deactivated by the control unit 16.

In the first embodiment according to FIGS. 1 to 4 in particular only the portion 32 to 36 of the touch screen 20 is activated in which the user interface 28 is momentarily displayed, i.e. only in this portion 32 to 36 the sensors for detecting the touch of the surface of the touch screen 20 are activated and detect a corresponding touch. In the remaining portions 32 to 36 of the touch screen 20 the touch is not detected. Alternatively, however the touch in the portion in which the user interface 28 is not displayed can be detected, but then the device 10 does not execute demands.

By means of the software-based varying of the display height of the user interface 28 described above it is achieved that a mechanical adjustment of the display unit 20 is not necessary, thus solving the risk of injuries and/or the sealing of the moving components. In particular, an ergonomically favorable display of the user interface 28 relative to the user of the device 10 is possible. Thus, for example extraordinarily tall or small persons as well as wheelchair users or users sitting in vehicles of different height can operate the device 10 easily.

What is claimed is:

1. A device for handling banknotes, comprising:
    a display unit with a display surface for displaying at least one graphic user interface to a user of the device
    wherein the user interface is displayed only in a portion of the display surface and
    said portion is automatically adjustable depending on the position of the user relative to the display surface.

2. The device according to claim 1, wherein a sensor unit is provided for determining the position of the user and wherein a control unit determines the portion in which the display unit displays the user interface as a function of an output of the sensor unit.

3. The device according to claim 1, wherein the device has at least one operating unit by means of which the user can adjust the portion of the display unit on which the interface is displayed.

4. The device according to claim 1, wherein the device further comprises a card reading unit for reading a magnetic stripe card and/or a chip card that reads out data with information on a preset preferred portion of the display unit for displaying the user interface, the data being stored on the magnetic stripe card or the chip card and wherein a control unit of the device determines the portion of the display unit for displaying the user interface depending on these data.

5. The device according to claim 1, wherein the a position of the user is the height of the user and/or the height of a vehicle in which the user sits.

6. The device according to claim 1, wherein the display unit comprises a touch screen.

7. The device according to claim 1, wherein at least two positions are preset for the in which the user interface is displayable, and that depending on the position of the user one of these preset positions is selected.

8. The device according to claim 1, wherein the display surface is rectangular and that it has a first side with a first side length and a second side with a second side length, wherein the user interface is rectangular and has a third side with a third side length and a fourth side with a fourth side length, wherein the first side and the third side are parallel to each other, wherein the first side length and the third side length are equal, and wherein the second side length is larger than the fourth side length.

9. The device according to claim 8, wherein the first side is directed horizontally in an operating direction of the device.

10. The device according to claim 8, wherein the second side length is an integral multiple, in particular three times the fourth side length.

11. The device according to claim 10, wherein several portions of the display surface for displaying the user interface are preset, wherein the number of the preset portions corresponds to the relation of the of the second side length to the fourth side length, and wherein the preset portions do not overlap.

12. The device according to claim 11, wherein along the second side of the display surface and/or along a fifth side of the display surface opposite of the second side a multitude of keys for selecting control information displayed by the user interface are arranged, and wherein a control unit of the device, depending on the portion in which the user interface is displayed, activates a subset of the keys arranged adjacent to the portion on which the user interface is displayed and/or deactivates the remaining keys.

13. The device according to claim 2, wherein the sensor comprises a camera for taking at least one picture with an image of a detection area including the user, and wherein control unit processes the image with processing program for determining the position of the user.

14. The device according to claim 3, wherein the operating unit comprises a first key for scrolling the portion in a first direction and a second key for scrolling the portion in a second direction opposite to the first direction.

15. Apparatus for handling banknotes comprising:
a module having a keyboard and a vertically elongated stationary display surface for displaying a graphical user interface image to a user of the apparatus;
the display surface having a height and a width;
the interface image having a height and a width, the height or width of the interface image being less than the height or width of the display surface so that the interface image is displayed only on a portion of the display at a given time; and
the interface image being configured to automatically move about the display surface as a function of a characteristic of the user relative to the display.

16. The apparatus of claim 15 wherein the widths of the display surface and the interface image are substantially the same, and wherein the interface image is moved upwardly or downwardly to one of several preset positions.

17. The apparatus of claim 15 wherein the interface image is moved depending on the height of the user.

18. The apparatus of claim 15 wherein the interface image is moved depending on the height of a vehicle in which the user sits.

19. The apparatus of claim 15 which further comprises:
a sensor for sensing a detection area adjacent the module, the sensor determining a characteristic of a user in the detection area and providing an output for moving the interface image to a position on the display that is related to the characteristic of the user so that information on the interface image can be more easily read by the user.

20. The apparatus of claim 15 wherein the apparatus comprises an automated teller machine.

* * * * *